O. TUNEBERG.
DEVICE FOR PROTECTING DRAFT ANIMALS FROM FLIES AND THE LIKE.
APPLICATION FILED NOV. 19, 1912.
1,183,700. Patented May 16, 1916.
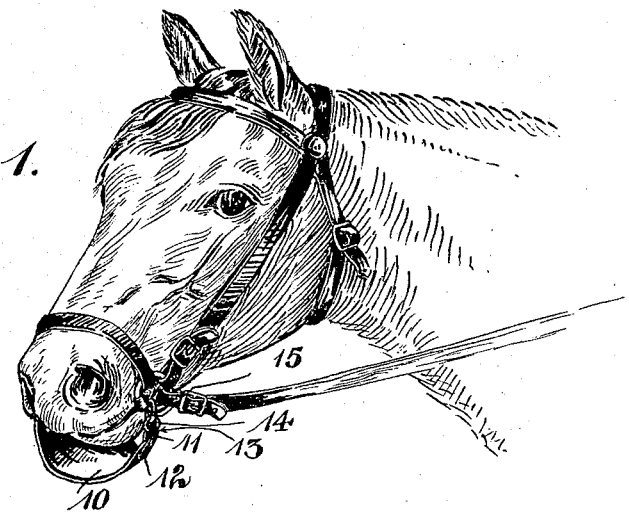
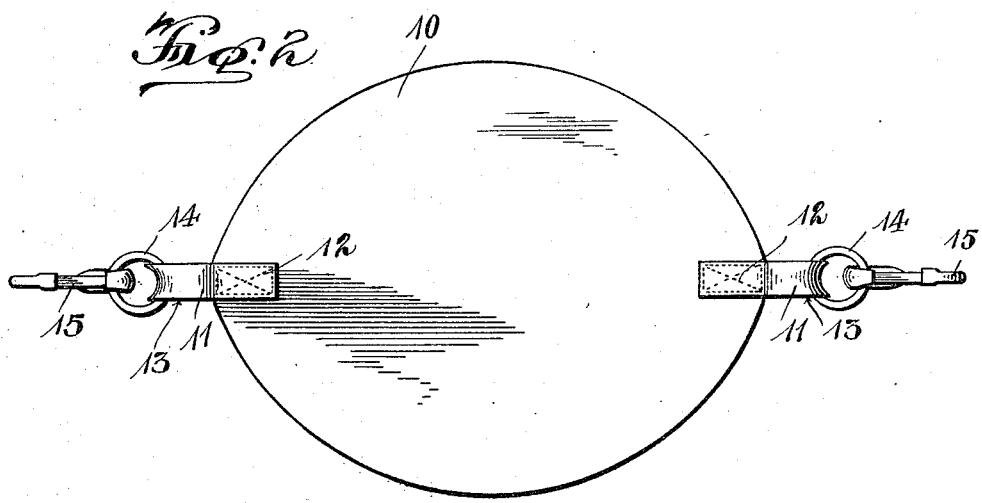
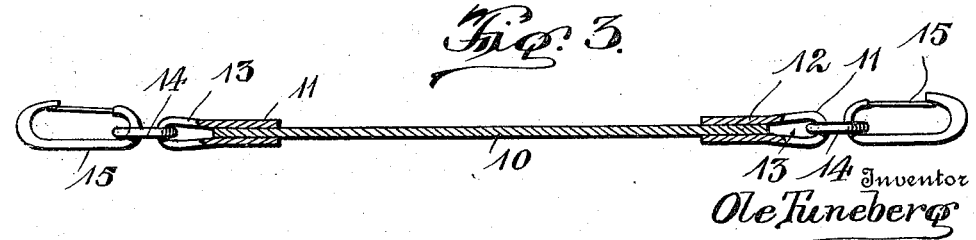
Inventor
Ole Tuneberg
Witnesses
By Victor J. Evans
Attorney

UNITED STATES PATENT OFFICE.

OLE TUNEBERG, OF KINDRED, NORTH DAKOTA.

DEVICE FOR PROTECTING DRAFT-ANIMALS FROM FLIES AND THE LIKE.

1,183,700.  Specification of Letters Patent.  Patented May 16, 1916.

Application filed November 19, 1912. Serial No. 732,305.

*To all whom it may concern:*

Be it known that I, OLE TUNEBERG, a subject of the King of Norway, residing at Kindred, in the county of Cass and State of North Dakota, have invented new and useful Improvements in Devices for Protecting Draft-Animals from Flies and the like, of which the following is a specification.

An object of the invention is to provide a device for protecting draft animals from the inroads of flies or other insects.

The invention embodies, among other features, a device that is preferably attached to the bridle of a harness upon a horse or other draft animal and which oscillates beneath the mouth and nostrils of the horse, thus protecting these organs from flies or other insects.

In the further disclosure of the invention reference is to be had to the accompanying drawings, constituting a part of this specification, in which similar characters of reference denote corresponding parts in all the views, and in which:

Figure 1 is a perspective view showing my device in applied position; Fig. 2 is a plan view; and Fig. 3 is a fragmentary vertical sectional view, taken on the line 3—3 in Fig. 2.

Referring more particularly to the views, use is made of a flexible elliptical plate 10, preferably made of a single piece of leather or the like, straps 11 having ends 12 thereof sewed or otherwise secured at opposite points on the ends of the plate 10 to reinforce the same at the point of connection with the straps, the said straps being bent upon themselves to form loops 13 having supporting rings 14 passing therethrough and freely movable between the closed ends of the loops and plate, suitable attaching hooks 15 having connection with the said rings and adapted for connection with the bit rings on a bridle 16 of a harness.

In the use of the device the hooks 15 are attached to the bit rings on the bridle 16 and the plate 10 will then be bent in a semi-circular fashion and will readily swing backward and forward beneath the mouth and nostrils of the horse or other draft animal, thus protecting these organs from flies or other insects.

The device described can be cheaply and efficiently constructed and can be quickly attached to or detached from the bridle of the harness.

Having thus described my invention, I claim:

1. In a protector of the class described, a flexible plate of elliptical shape adapted to be supported by its ends for swinging movement beneath the mouth of an animal, and means for supporting the said plate including loops at opposite ends of the plate, each loop consisting of a strip of material having its ends stitched to the opposite sides of the plate to reinforce the same at its point of connection with said means.

2. In a protector of the class described, snap hooks, rings carried by said hooks, strips of material passed through said rings and doubled to provide spaced parallel arms, and a flexible plate of elliptical shape interposed between said strips with the ends of the plate disposed between and secured to the ends of said arms to provide loops in which said rings may turn and slide when the device is in use.

In testimony whereof I affix my signature in presence of two witnesses.

OLE TUNEBERG.

Witnesses:
ADOLPH DOKKEN,
JOHN OTTIS.

Copies of this patent may be obtained for five cents each, by addressing the "Commissioner of Patents, Washington, D. C."